June 21, 1960 A. J. M. SCHRAMM 2,942,202

AMPLIFIER CIRCUIT FOR ELECTRICAL SIGNALS

Filed March 20, 1956 2 Sheets-Sheet 1

INVENTOR:
Arnaldo Jorge Maria Schramm
BY:
Michael S. Striker
agt.

June 21, 1960 A. J. M. SCHRAMM 2,942,202

AMPLIFIER CIRCUIT FOR ELECTRICAL SIGNALS

Filed March 20, 1956 2 Sheets-Sheet 2

INVENTOR:
Arnaldo Jorge Maria Schramm
BY:
Michael S. Striker
agt.

United States Patent Office 2,942,202
Patented June 21, 1960

2,942,202

AMPLIFIER CIRCUIT FOR ELECTRICAL SIGNALS

Arnaldo Jorge Maria Schramm, Espana No. 136 Cipolletti, Rio Negro, Argentina

Filed Mar. 20, 1956, Ser. No. 572,753

3 Claims. (Cl. 330—117)

The present invention refers to a new amplifier, of the direct coupling type, for electrical signals, with its output tubes connected in push-pull, its object being a specific circuit disposition capable of giving positive advantages of a practical, functional and economic order which will be made manifest in the course of this specification.

From a more particular point of view, the invention implies a new circuit for audio amplification and amplification of slow impulses with direct coupling and automatic phase shift; providing three sound channels with re-enforcement of high and low frequency tones, one single manual control with visual indicator of the balance and overloading conditions and with selection in the final stage for working either as a triode or pentode (tetrode) indiscriminately, the finality of said circuit being to overcome serious inconveniences which up to the present are found in this class of amplifier circuit, since in the known circuits commonly used it is always essential to have a technician in order to balance them and obtain their maximum efficiency, due to the complicated manipulations which it is necessary to carry out on the numerous controls.

The amplifier circuit object of the present invention, completely overcomes all the inconveniences cited above, since the balancing of same is carried out by a single control, which together with a visual indicating instrument, indicates the balance and overload conditions, the circuit having furthermore the corresponding controls for high and low frequency tones.

Before proceeding any further with the description, it is considered convenient however to establish that, in the matter of audio amplifier circuits, several types of coupling are known for exciting the final push-pull stage, i.e., impedance-capacity, resistance-capacity, transformer coupling, etc., elements which introduce a certain amount of distortion in the signals to be amplified. This inconvenience is eliminated in the circuit herein claimed, since the coupling utilized for same is that known as "direct coupling;" that is to say, that in which the impedance common to both circuits is connected directly between them, it being admitted that this disposition does not constitute a novelty, although it is claimed in merit that said coupling gives a more satisfactory operation of the whole, so obtaining a high fidelity reproduction.

The difficulties which are actually found in audio amplifier circuits of direct coupling, refer undoubtedly to obtaining a perfect and permanent balance of same, and recourse is made—in the known and commonly used circuits—to complicated power sources provided with tension stabilizers, etc., as also the use of matched tubes of equal efficiency in order to avoid the distortion of the signal, all of which bears very unfavorably in the cost of said circuits and in their maintenance, so much so that there does not exist in the world market nor any local market, amplifier circuits of the type mentioned at a reasonably economical price. To this must be added the fact that in these circuits other disadvantages are added and represented by the phase shift of the signal, equalization, re-enforcing of tones, etc., which require the utilization of special tubes and complex controls of difficult manipulation for those who do not possess the technical knowledge on the subject, but who notwithstanding, like and enjoy high fidelity in audio frequency reproduction.

In the new audio amplifier circuit, object of the present invention, the above mentioned difficulties and inconveniences—as has already been stated—have been completely overcome, since same does not require a stabilized power source, it operates with the simplest of power sources and does not require the use of special thermionic vacuum tubes. In fact, the said circuit admits the use of radio receiving tubes easily obtainable in the local market, such as the 6AT6, 6L6, 6V6, etc., and these in small quantities as the circuit only has two 6AT6 units or similar tubes, or a double unit such as the 6SL7 for preamplification, selection and re-enforcement of tones, providing three sound channels, two 6L6 or 6V6 tubes as out-put tubes, that is to say, low priced tubes which however does not impair the extraordinary quality in efficiency.

The circuit in question has a specially designed instrument incorporated in it which constitutes an integral part of the invention; said instrument indicates perfect balance of the circuit in a clearly visible manner and without any complication whatsoever for a person without any technical knowledge of the art, indicating furthermore, any overload condition in the circuit due to bad adjustment of the gain controls.

In order that the present invention be clearly understood and easily put into practice, it is here presented in its preferable form in the accompanying drawings and in which.

Figure 4:
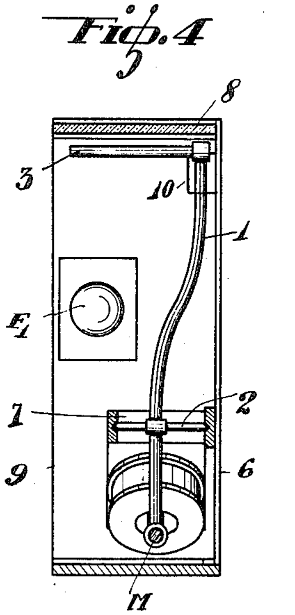

Lastly, Figure 4 represents a side view partially cut away, of the indicating instrument shown in the previous figure.

In all the figures given, the same letters and reference numbers indicate equal or equivalent parts.

Figure 1:
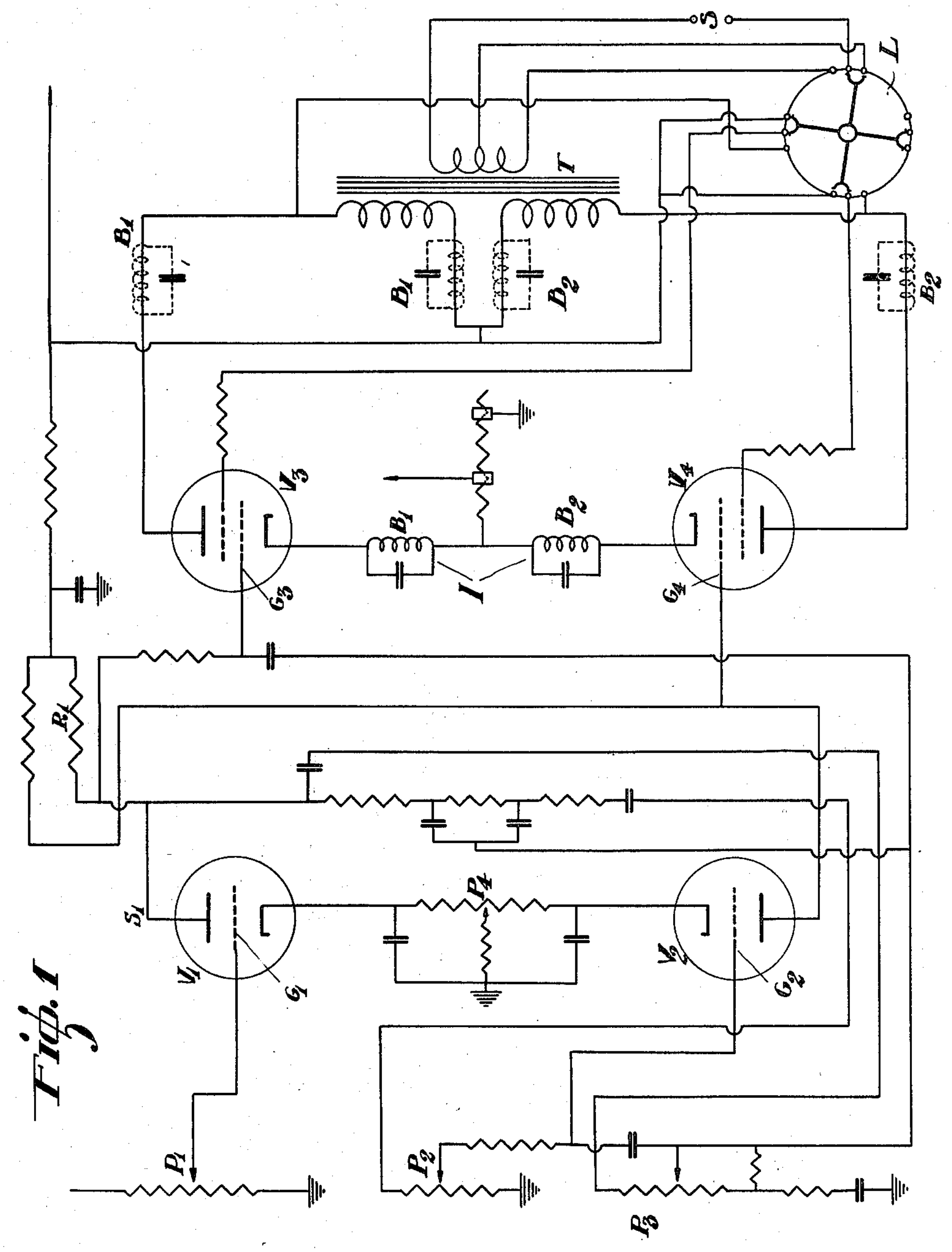
Figure 1 represents a block schematic of an audio amplifier circuit of direct coupling which has the improvements object of this invention incorporated in it.

Related to these, especially in Figure 1, it is to be noted that the input signal containing a wide range of audio-frequencies, is applied directly to the grid G1 of the first preamplifier tube V1 through a potentiometer P1 which serves to control the tension of said signal, governing in this manner the volume of the general input channel and thus of the entire equipment.

Figure 2:
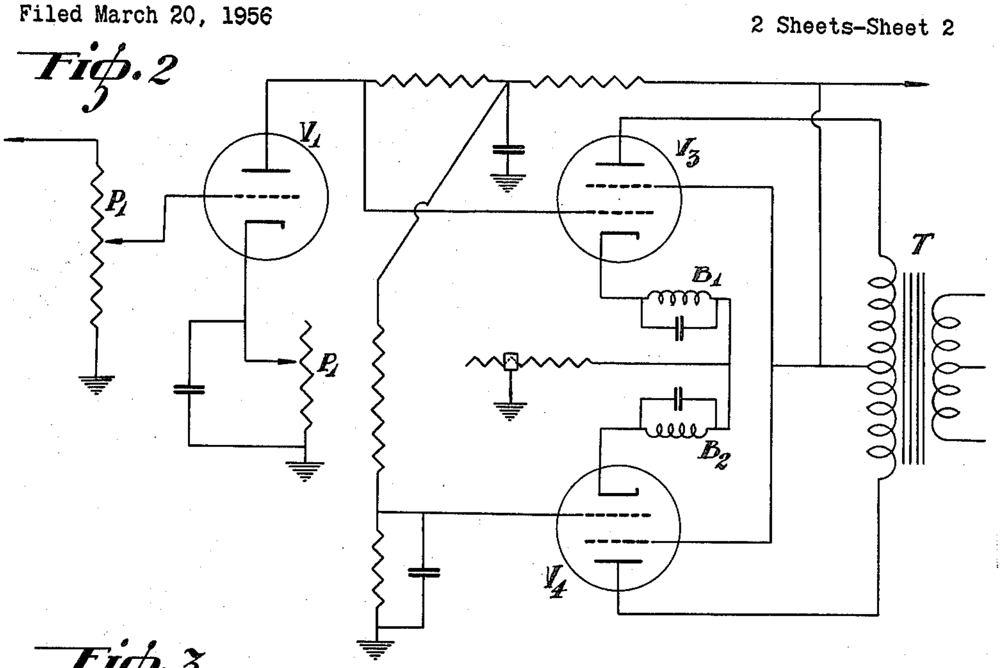
Figure 2 illustrates, also in schematic form, the basic disposition of the circuit claimed, in a simplified form.

Said signal on being amplified by the above mentioned tube V1, causes the increased tension to appear through the load resistance R1 of same, the increase obtained depending on the amplification factor of the tube used. The signal thus obtained at the point S1, passes, on one hand, directly to the grid G3 of one of the out-put tubes, V3, for example (direct-coupling), working as a class A amplifier, that is to say, that in which the grid bias and the alternating tension applied to the grid, are such, that plate current of the tube circulates at all moments during the complete cycle of the applied signal. If the equipment is used with only one channel, the tube V2 can be substituted by a network of resistances equivalent to said tube (Fig. 2). The high sensibility obtained is due to the great cathode resistance used, several times greater than that commonly and normally used, and which forms part of the automatic phase shift described below, resulting from what has been said up to the present that the equipment is totally of direct coupling, for which reason its amplitude for amplifying any kind of impulse or audio frequency tension or D.C. pulse, is above discussion.

Starting again from the point S1 and utilizing the tension there obtained, the amplified signal is also passed through a conventional resistance-capacitance type selection circuit, as shown. Here the signal is separated into three frequency bands carried in separate channels for the high, medium and low tones, this signal being simultaneously phase-shifted so as to be 180° out of phase with respect to the input signal amplified by tube V1, and ready to be applied to the grid of the second triode V2 of the circuit through two potentiometers P2 and P3, connected to said channels for selectively adjusting the volume ratio between the different channels or frequency bands containing the high, medium and low tones separately. The signal after being thus recombined and amplified by the aforementioned tube V2 and in the same manner as the V1 tube, is, as mentioned above, also 180° out of phase with respect to the signal at the point S1 and is therefore ready to be directly coupled to the grid G4 of the second out-put tube V4, connected in push-pull fashion with, and operating in the same manner as, the tube V3, and in absolute harmony with same.

The balancing circuit is composed of a single potentiometer control P4 and capacitors, as shown, which in combination with the indicating instrument for balance I, establishes the point at which the same intensity of current flows through both out-put tubes V3 and V4 whose cathodes are directly coupled. This is due to the fact that the respective fixed coils B1 and B2 of said instrument are connected in series with the plate or cathode circuit of each one of the above mentioned out-put tubes V3 and V4.

Said coils actuate on a permanent magnet M placed on one of the ends of an arm 1, mounted on a pivoted shaft 2 and the opposite end of which carries an indicating member 3 fixed perpendicularly, which indicates the position of said arm, therefore, of the movable magnet M.

This latter is polarized N and S at its ends, so that if the same intensity of current flows through the coils B1 and B2 which are fixed and placed equidistant from the mid-point of the said permanent magnet M, the oscillating arm 2 will be maintained in the center, indicating with its pointer 3 the state of balance, said balance being governed by the control P4 constituted by a conventional potentiometer connected between the cathodes of tubes V1 and V2, while its mid-point is tapped to ground through an adequate resistor in accordance with the tube utilized. As the control grids of the out-put tubes V3 and V4 are directly coupled to the plates of the pre-amplifier tubes V1 and V2, the biasing of these last constitute the governing factor of those, that is to say, that the working of the control P4 will regulate the balance of the circuit due to the fact that the cathodes of the said tubes V1 and V2 are connected in shunt to ground and through the usual biasing capacitors for the cathode.

Figure 3:
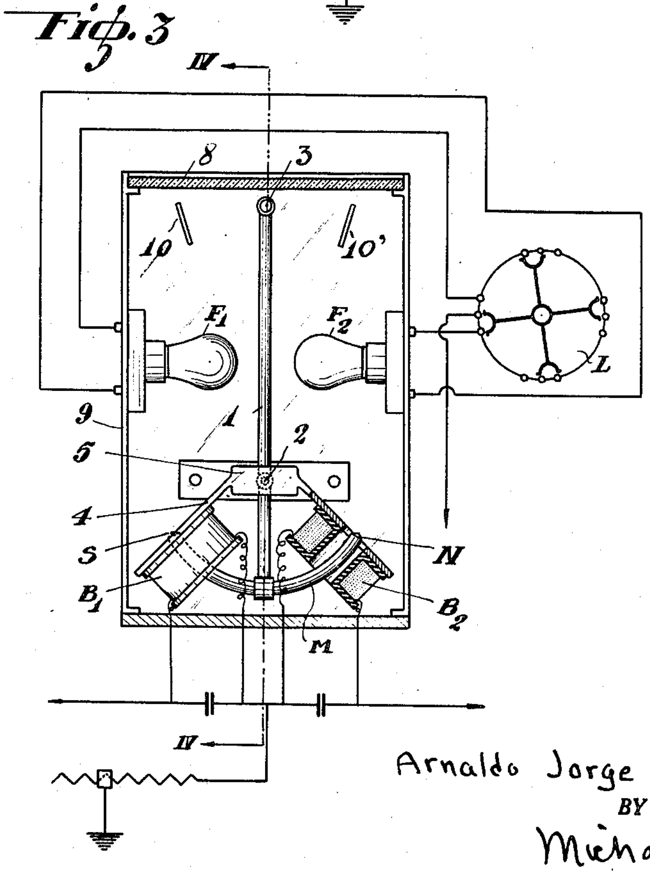
Figure 3 shows a top view, partly in section, of the indicating instrument.

As may be noted in Figures 3 and 4, the indicating instrument is constituted by two coils B1 and B2, of a tubular core, connected to the plate or cathode circuit of the respective tubes V3 and V4 of the out-put push-pull, and whose coils are mounted on the facing sides of a laminar supporting member 4 in the shape of a U, secured perpendicularly by its central part to a horizontal base plate 6; in the said central part 5 an opening 7 is made, in which is mounted perpendicularly on pivots (Figure 4) a shaft 2 joined to an oscillating arm 1, disposed parallelly to the base plate and at one of its ends a relatively heavy permanent magnet M is fixed, the pole pieces N and S of which are oriented coincident with the tubular cores of the fixed coils B1 and B2. At the opposite end of said oscillating arm 1 the pointer 3 is vertically secured, visible through a small window 8 of transparent material and constituted by one of the walls of the metallic case 9 in which the instrument is lodged.

The above mentioned oscillating arm 1, with its complementary elements, is properly balanced and the extremes of its oscillating travel protected in the extreme corresponding to the pointer 3, by means of a pair of stops 10 and 10' of elastic material.

It is evident then—in accordance with what has been established—that the flux produced by the same current intensity in the coils B1 and B2 will determine the equidistant position of the permanent magnet M with relation to said coils, in whose magnetic field same is placed and in which condition the pointer 3 will indicate the balanced condition of the circuit, whereas the overloaded condition of same will be indicated by the movement of the latter due to its inertia.

In the above mentioned Figures 3 and 4, it may be noted, that in the interior of the indicating instrument, there are small lamps F1 and F2 of different colours, which by means of switch L, serve the purpose of signalling the working of the push-pull tubes as triodes or tetrodes respectively.

From the foregoing detailed description, the characteristic advantages of a practical, functional and economic order of the invention have been clearly defined, it is only necessary to state that said description and its corresponding graphical complement are purely demonstrative and do not limit the invention since it undoubtedly admits the introduction of small constructional modifications and of details within the scope corresponding to same without detracting from the limits and scope of the following claims.

What I claim is:

1. In an apparatus for amplifying electrical signals containing a plurality of frequencies within a predetermined wide range of frequencies, in combination, a pair of input tubes, each of said input tubes respectively having a cathode, an anode and a control electrode, the control electrode of one of said input tubes being adapted to have said electrical signals applied thereto; an output circuit including a pair of output tubes connected in push-pull arrangement, each of said output tubes respectively having at least an anode, a cathode and a control electrode and adapted to have current flow therethrough; circuit means connected between the anode of one of said input tubes and the control electrodes of said output tubes for supplying amplified signals from said one input tube to said output tubes; single current control means connected between the cathodes of said input tubes for equalizing any currents flowing through said output tubes by correspondingly controlling said input tubes; selection circuit means comprising a resistance-capacitance network connected in circuit between the anode of said one of said input tubes and the control electrode of the other one of said input tubes for separating amplified signals appearing at the anode of said one input tube into frequency bands in a preselected manner, separate channels for carrying the separated frequency bands, and potentiometer means for varying the volume relation between the frequency bands carried by said channels, respectively, and connected to the control electrode of the other one of said input tubes, said channels being connected between said resistance-capacitance network and said potentiometer means for recombining the separated amplified signals containing different frequency bands, respectively, at selectively adjusted volumes before the same are applied to the control electrode of said other input tube; and circuit means connected between the anode of the other one of said input tubes and the control electrodes of said output tubes for supplying amplified signals from said other one of said input tubes to said output tubes so that the separated amplified signals are applied with a predominant volume of at least one of said different frequency bands to said output tubes, the combined output of said output tubes being balanced and containing as one component signals supplied by the anode of said one input tube and as a second component the differently amplified frequency bands supplied by said other one of said input tubes.

2. In an apparatus for amplifying electrical signals containing a plurality of frequencies within a predetermined wide range of frequencies, in combination, a pair of input tubes, each of said input tubes respectively having a cathode, an anode and a control electrode, the control electrode of one of said input tubes being adapted to have said electrical signals applied thereto; an output circuit including a pair of output tubes connected in push-pull arrangement, each of said output tubes respectively having at least an anode, a cathode and a control electrode and adapted to have current flow therethrough; direct-coupling means connected in circuit between the anode of one of said input tubes and the control electrodes of said output tubes of directly coupling amplified signals from said input tube to said output tubes; single current control means for equalizing any currents flowing through said output tubes by correspondingly controlling said input tubes, said single current control means comprising a potentiometer having end points respectively connected to the cathodes of said input tubes and having an adjustable tapping point; resistance means connected in circuit between said adjustable tapping point of said potentiometer and a point at ground potential; a pair of capacitors, each of said capacitors being respectively connected between one of said end points of said potentiometer and a point at ground potential; selection circuit means comprising a resistance-capacitance network connected in circuit between the anode of said one of said input tubes and the control electrode of the other of said input tubes for separating amplified signals appearing at the anode of said one input tube into frequency bands in a preselected manner, separate channels for carrying the separated frequency bands, and potentiometer means for varying the volume relation between the frequency bands carried by said channels, respectively, and connected to the control electrodes of the other one of said input tubes, said channels being connected between said resistance-capacitance network and said potentiometer means for recombining the separated amplified signals containing different frequency bands, respectively, at selectively adjusted volumes before the same are applied to the control electrode of said other input tube; and direct-coupling means connected between the anode of the other one of said input tubes and the control electrodes of said output tubes for directly coupling amplified signals from said other one of said input tubes to said output tubes so that the separated amplified signals are applied with a predominant volume of at least one of said different frequency bands to said output tubes, the combined output of said output tubes being balanced and containing as one component signals supplied by the anode of said one input tube and as a second component the differently amplified frequency bands supplied by said other one of said input tubes.

3. In an apparatus for amplifying electrical signals containing a plurality of frequencies within a predetermined wide range of frequencies, in combination, a pair of input tubes, each of said input tubes respectively having a cathode, an anode and a control electrode, the control electrode of one of said input tubes being adapted to have said electrical signals applied thereto; an output circuit including a pair of output tubes connected in push-pull arrangement, each of said output tubes respectively having at least an anode, a cathode and a control electrode and adapted to have current flow therethrough; direct-coupling means connected in circuit between the anode of one of said input tubes and the control electrodes of said output tubes for directly coupling amplified signals from said one of said input tubes to said output tubes; single current control means connected between the cathodes of said input tubes for equalizing any currents flowing through said output tubes by correspondingly controlling said input tubes; selection circuit means comprising a resistance-capacitance network connected in circuit between the anode of said one of said input tubes and the control electrode of the other one of said input tubes for separating amplified signals appearing at the anode of said one input tube into frequency bands in a preselected manner, separate channels for carrying the separated frequency bands, and potentiometer means for varying the volume relation between the frequency bands carried by said channels, respectively, and connected to the control electrode of the other one of said input tubes, said channels being connected between said resistance-capacitance network and said potentiometer means for recombining the separated amplified signals containing different frequency bands, respectively, at selectively adjusted volumes before the same are applied to the control electrode of said other input tube; and direct-coupling circuit means connected between the anode of the other one of said input tubes and the control electrodes of said output tubes for directly coupling amplified signals from said other one of said input tubes to said output tubes so that the separated amplified signals are applied with a predominant volume of at least one of said different frequency bands to said output tubes, the combined output of said output tubes being balanced and containing as one component signals supplied by the anode of said one input tube and as a second component the differently amplified frequency bands supplied by said other one of said input tubes.

References Cited in the file of this patent

UNITED STATES PATENTS

| | | |
|---|---|---|
| 1,948,912 | Geyer | Feb. 27, 1934 |
| 2,358,428 | White | Sept. 19, 1944 |
| 2,432,826 | Smith | Dec. 16, 1947 |
| 2,462,849 | Dishal et al. | Mar. 1, 1949 |
| 2,529,459 | Pourciav et al. | Nov. 7, 1950 |
| 2,687,935 | Cannon | Aug. 31, 1954 |
| 2,694,169 | Ehret | Nov. 9, 1954 |
| 2,747,028 | Clark | May 22, 1956 |
| 2,757,331 | Patrusky et al. | July 31, 1956 |
| 2,777,904 | Milbourne | Jan. 15, 1957 |

OTHER REFERENCES

Publication I, Radio Electronics, vol. 23, issue 3, page 27, December 1951.